Aug. 7, 1923.

A. L. POWELL

TIRE INFLATING APPARATUS

Filed Nov. 22, 1920

A. L. Powell
INVENTOR

BY Victor J. Evans
ATTORNEY

WITNESS:

Aug. 7, 1923.

A. L. POWELL 1,464,443

TIRE INFLATING APPARATUS

Filed Nov. 22, 1920 2 Sheets-Sheet 2

A. L. Powell
INVENTOR

BY Victor J. Evans
ATTORNEY

WITNESS:

Patented Aug. 7, 1923.

1,464,443

UNITED STATES PATENT OFFICE.

ALPHONSE L. POWELL, OF ALTUS, OKLAHOMA.

TIRE-INFLATING APPARATUS.

Application filed November 22, 1920. Serial No. 425,877.

*To all whom it may concern:*

Be it known that I, ALPHONSE L. POWELL, a citizen of the United States, residing at Altus, in the county of Jackson and State of Oklahoma, have invented new and useful Improvements in Tire-Inflating Apparatus, of which the following is a specification.

This invention relates to a tire inflating apparatus, for motor vehicles, and comprehends a construction adapted to be carried upon the motor vehicle, embodying amongst other features, a pump in combination with operating means therefor actuated by the exhaust from the motor, the apparatus being simple, effective and reliable for the purpose intended.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein.

Figure 1:
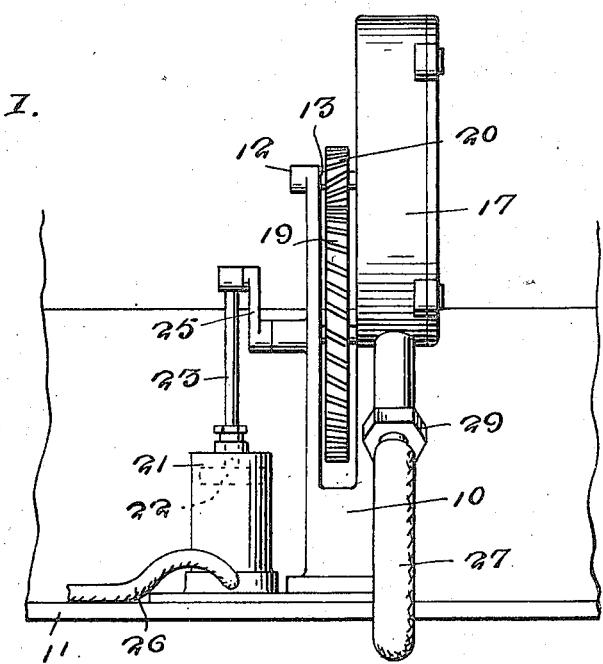
Figure 1 is a side elevation of an automobile partly broken away, showing the tire inflating apparatus in its applied position.
Figure 3:
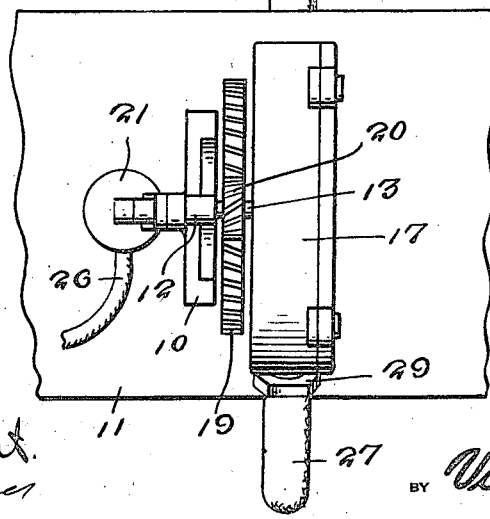
Figure 3 is a top plan view with the casing for the rotor removed.
Figure 2:
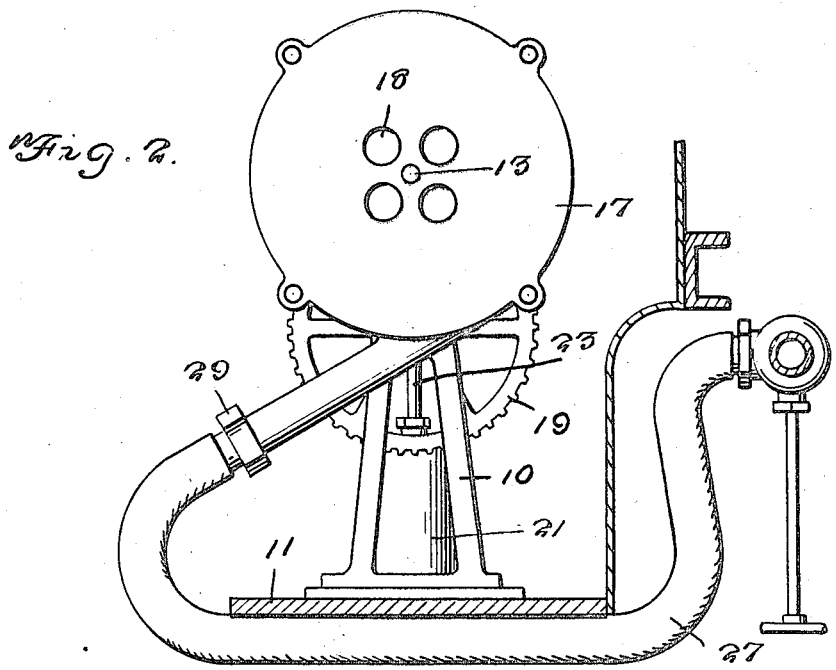
Figure 2 is a vertical sectional view therethrough.
Figure 4:
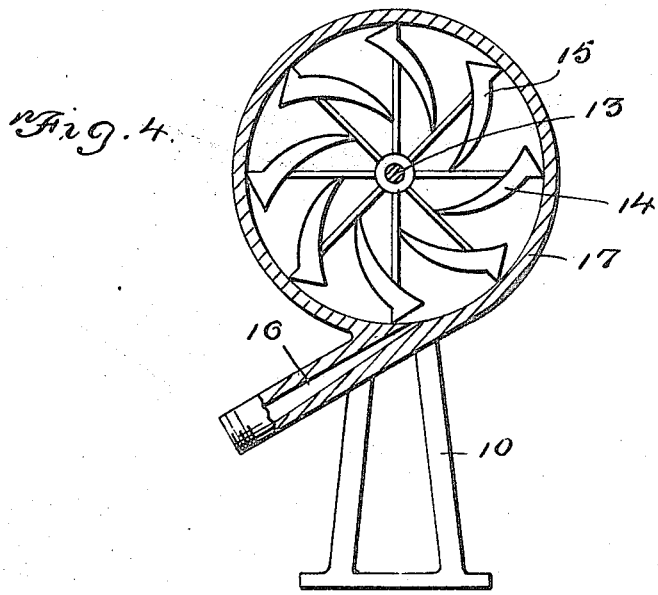
Figure 4 is a vertical sectional view taken at right angles to Figure 2.

The apparatus forming the subject matter of my invention comprises a support or standard indicated at 10 and adapted to be secured in any suitable manner upon the running board 11 of the motor vehicle. The upper end of the standard is provided with a bearing 12 for a stub shaft 13, while fixed upon the shaft is a rotor 14. The rotor may be of any suitable diameter, and provided with a plurality of vanes or buckets 15 which receives the force of the exhaust from the motor through the jet 16 tangentially disposed with respect to the casing 17 which encloses the rotor. The casing is provided with exhaust openings 18.

Disposed to one side of the rotor and projecting an appreciable distance below the latter is a large gear 19 which is rotated through the instrumentality of a worm gear 20 fixed upon the shaft 13. Arranged upon the running board to one side of the standard 10 is a pump 21, in which the piston 22 is arranged to reciprocate. The piston rod 23 projects through the top of the pump cylinder and is operatively associated with the crank 25 carried by the gear 19. A flexible hose 26 is connected with the pump cylinder and is adapted to have its free end connected in the usual manner with the tire to be inflated. The exhaust from the motor is conveyed to the jet 16 by means of a flexible tube or pipe 27 which is terminally connected with the exhaust pipe between the muffler and the motor of the car, passing under the chassis and detachably connected with the jet by means of the coupling 29. There is a double cut-out valve at the point of connection between the tube or pipe 27 and the exhaust pipe of the engine, and when it is desired to make use of the apparatus, communication is established between the pipe 27 and the exhaust pipe of the motor. In practice, the exhaust is conveyed through the pipe 27 to the jet 16 and forcibly delivered against the vanes or buckets 15 rotating the rotor 14. This obviously rotates the shaft 13 upon which the rotor is fixed, and also imparts a similar motion to the gear 19 through the instrumentality of the worm gear 20. The crank 25 is thus actuated to reciprocate the piston of the pump. Manifestly any one of the tires of the vehicle can be quickly inflated, without any effort on part of the operator, it being of course understood that the flexible tube 26 is of sufficient length to reach any one of the wheels of the vehicle.

While I have shown and described what I consider the preferred embodiment of the invention, I desire to have it understood that I do not limit myself in this connection, and that such changes may be resorted to when desired as fall within the scope of what is claimed.

What is claimed is:

A tire inflating apparatus for motor vehicles comprising in combination, a standard adapted to be supported by the running board of the vehicle, a pump supported by the running board in juxta-position to the standard and including a reciprocating piston, a shaft journaled in the standard and having a crank portion connected with the upper end of the piston rod, a large gear fixed on said shaft, a casing supported by said standard and disposed to one side and slightly above one gear, a rotor arranged to operate in said casing, a jet projecting from said casing, a pipe adapted to establish communication between the jet and the exhaust manifold of the motor to operate the latter, said rotor including a shaft projecting from one side of the casing and journaled in the upper end of the standard, and a gear carried by said rotor shaft and meshing with the first mentioned gear as and for the purpose specified.

In testimony whereof I affix my signature.

ALPHONSE L. POWELL.